United States Patent [19]
Valerino, Sr. et al.

[11] Patent Number: 5,871,308
[45] Date of Patent: Feb. 16, 1999

[54] WATERTIGHT CARRIER FOR PNEUMATIC TUBE SYSTEMS

[76] Inventors: Frederick M. Valerino, Sr., 327 Gailridge Rd., Timonium, Md. 21093; Joseph H. Gaultney, 112 Brandon Rd., Baltimore, Md. 21212; Robert D. Moritz, 14107 Robcaste Rd., Phoenix, Md. 21131; Brian Fullerton, 7706 Chapman Rd., Kingsville, Md. 21807

[21] Appl. No.: 871,470

[22] Filed: Jun. 9, 1997

Related U.S. Application Data

[63] Continuation of Ser. No. 498,062, Jul. 5, 1995, Pat. No. 5,636,947.

[51] Int. Cl.[6] .................................................. B05G 51/04
[52] U.S. Cl. ........................................... 406/186; 406/184
[58] Field of Search ................................ 406/184, 186, 406/187, 188, 189

[56] References Cited

U.S. PATENT DOCUMENTS

| | | | |
|---|---|---|---|
| 3,072,362 | 1/1963 | Allen | 406/188 |
| 3,593,948 | 7/1971 | McClellan | 406/186 |
| 3,825,210 | 7/1974 | Weaver | 406/186 |
| 4,006,868 | 2/1977 | Hochradel et al. | 406/186 |
| 5,636,947 | 6/1997 | Valerino et al. | 406/186 |

FOREIGN PATENT DOCUMENTS

| | | | |
|---|---|---|---|
| 4111492 A | 10/1992 | Germany | 406/188 |

*Primary Examiner*—Gary C. Hoge
*Attorney, Agent, or Firm*—Ward & Olivo

[57] ABSTRACT

A carrier for transporting articles through pneumatic tube systems is disclosed. The carrier has first and second shells disposed about a longitudinal axis and connected by hinges such that the shells are moved transversely relative to one another when opening and closing the carrier. A seal such as a gasket or rubber seal is included within the interior of the carrier. Optionally, a sensor is used to indicate the presence of an abnormal condition within the carrier. Optionally, a lock is used to prevent opening.

14 Claims, 6 Drawing Sheets

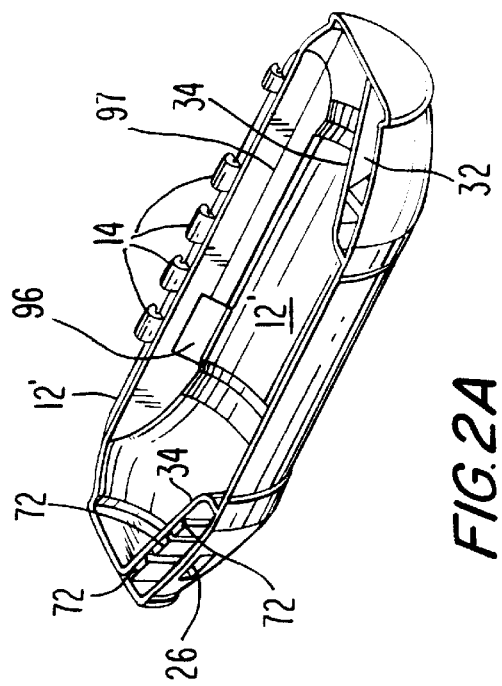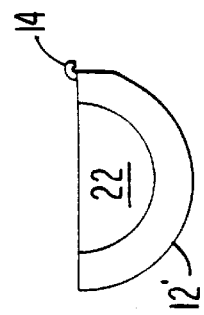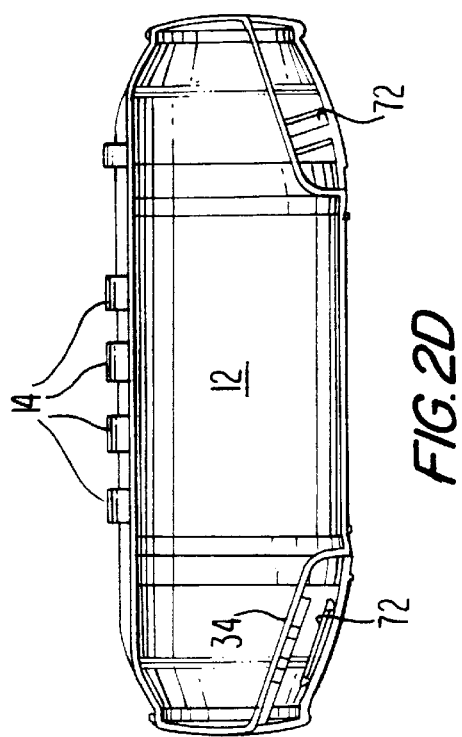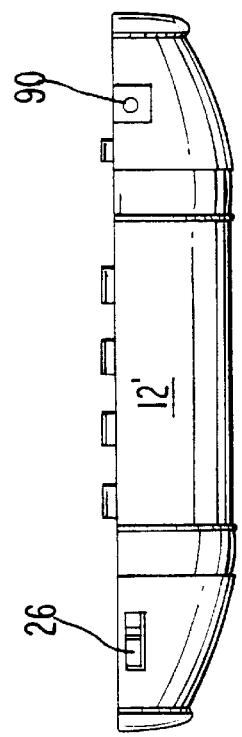

WATERTIGHT CARRIER FOR PNEUMATIC TUBE SYSTEMS

This application is a continuation of Ser. No. 08/498,062, filed Jul. 5, 1995, now U.S. Pat. No. 5,636,947.

TECHNICAL FIELD

This invention relates to pneumatic tube carriers and, more particularly, to a pneumatic tube carrier which includes, as an integral part thereof, a sealing apparatus so that liquid, solid or gaseous substances contained within the carrier cannot escape to the outside. As well, substances situated outside of the carrier cannot penetrate the interior of the carrier. Such watertight or airtight qualities are important in the medical industry, especially in the transport of biohazardous or otherwise toxic materials. In those cases, escaping materials can be dangerous. Also, with pneumatic tube systems, leaking materials, particularly fluids, can "gum" or "foul" the interior walls of the tubes, resulting in increased maintenance, degraded performance (less speed, increased power consumption, etc.), and the like.

BACKGROUND ART

The transporting of articles via pneumatic tubes is old and well known. Basically, an object is placed within a container which is then transported by air under either positive or negative pressure from one destination to another. The transport is moved within a closed tube. The interior of the closed tube and the outer dimension of the carrier form a seal, so that the carrier can be propelled between the destinations by a vacuum.

One area of commerce which currently uses the pneumatic tube and the transporting of material via the pneumatic tube on a fairly regular basis is the hospital or biomedical research/manufacturing industry. One particular application of this technology is in the area of transporting blood samples, medicines, intravenous bags, viral samples or other biological or chemical matter between diverse locations within a hospital or laboratory. In that environment, for example, test tubes or vials of liquids are placed within a tube carrier, and are typically secured by foam or clamps within the carrier. The purpose of securing the samples (which are often contained within glass test tubes with rubber stoppers) is to help prevent breakage. When glass breaks or stoppers become dislodged (as can happen when hospital workers fail to properly secure the stopper in the first place), chemical or biological substances can leak into the interior of the carrier. In turn, said substances can leak out of the interior of the carrier, thereby contaminating the interior walls of the tube system. The vials or vessels of liquids, solids or gasses within the carrier can move or shift during transport, which may also lead to breakage. This problem is especially acute, as the carriers are often traveling at speeds in excess of 25 feet per second. Because of the rapid acceleration and deceleration of pneumatic tube carriers, the carrier contents can easily become dislodged, and can break within the carrier, if not for clamps, foam securing means, and the like. Nonetheless, accidents can happen, whereby despite the best efforts toward securing or protecting the interior vessels, they can break, or their stoppers can become dislodged. In fact, dislodged stoppers are a primary problem, due mainly to workers who may inadvertently fail to secure them properly in the first place.

If the leaking substance is of a large enough quantity, the substance (often a fluid) can leak out of the carrier. In that case, the entire tube transport system could become contaminated with the substance. For example, if fluids containing a virus or bacteria sample (for example, the HIV virus or the Ebola bacteria) were to leak out of a carrier, the interior of the vacuum transport tubes could become breeding grounds for the biological specimens—thus contaminating the exteriors of all carriers that pass through the system. Obviously, the recent public concerns over infectious diseases is a primary motivation behind the present invention. Also equally important is that fluids escaping from the carrier can "gum up" the interior of the vacuum tubes, making the smooth passage of the carrier difficult, resulting in enhanced downtime, increased maintenance expense, and increased power consumption (that is, friction would increase within the tube system).

If fluids escape from the vials and/or test tubes, but are contained within the carrier, the aforementioned problems can be mitigated. Of course, other problems can result. For example, a hospital worker may cut his or her hands on a broken vial when they proceed to open the carrier, and dangerous substances contained within the carrier may come in contact with the hospital worker. Also, in the case where toxic, aromatic substances such as toluene or benzene are being transported within vessels contained within the carriers, obviously, the worker would be placed in great danger if he or she opened the carrier under those circumstances. Basically, if a hospital worker opens a carrier expecting to remove sealed vessels and/or containers, and conversely, is presented with spilled contents (which may often be accompanied by broken glass, for example), then, the possibility of infecting the hospital worker or the overall tube system is great. For that reason, a watertight or airtight carrier could facilitate containing the hazardous substances within the carrier, so that vessels which may break or become unsealed in the transport process are contained within the carrier. Of course, problems can still result if workers open a carrier without knowledge of the hazardous conditions within. To safeguard against this event, the carrier could contain an indicator on its exterior that notifies the carrier handler of the interior circumstances—before the carrier is opened. In that case, if the interior contents are, for example, toxic gasses, the carrier may be opened in a controlled, safe environment.

There exists a need in the field to provide a carrier with suitable watertight and airtight properties, such that matter from within the carrier cannot escape to the outside, and matter that has become uncontrollable within the carrier can activate a warning indicator on the exterior of the carrier, so that hospital or other workers who use the carriers will not open carriers with uncontrolled contents (without ample warning that proper measures should be taken). That could be facilitated by a warning signal indicative of a spill or other abnormal condition within the carrier. Such a warning signal may even be a digital output, which can be decoded, to indicate what type of hazard lies within the carrier. Such a warning signal could also trigger a locking mechanism, making the opening of a carrier with spilled interior substances impossible without authorization and a form of key, electronic or otherwise. Also, based on the contents of the carrier, the locking mechanism may be activated so that only certain parties may be able to open the carrier, regardless of whether an uncontrolled substance is contained within. For example, if a dangerous controlled substance such as morphine is being transported, the carrier may be locked, and only certain authorized persons would be able to open the carrier.

Prior art known to the inventor includes U.S. Patent Nos. 4,948,303 to Good, 4,324,511 to Irish, 4,219,290 to Golston, 4,149,685 to Leavelle, and 3,825,210 to Weaver, which are incorporated herein by reference.

U.S. Pat. No. 4,948,303, granted to Good; discloses a pneumatic tube carrier with a reinforced hinge.

U.S. Pat. No. 4,324,511, granted to Irish, discloses a pneumatic tube carrier with an accelerator ring.

U.S. Pat. No. 4,219,290, granted to Golston, discloses a hinged pneumatic tube carrier with an improved side opening mechanism.

U.S. Pat. No. 4,149,685, granted to Leavelle, Apr. 17, 1979, discloses a pneumatic carrier having identical halves and includes means to adjust the latch mechanism.

U.S. Pat. No. Re. 30,882, granted, Mar. 16, 1982, to Leavelle is directed to an adjustable closure mechanism.

U.S. Pat. No. 3,825,210, granted to Weaver, Jul. 23, 1974, discloses a "clamshell" type pneumatic tube carrier of a bullet configuration wherein the seals which substantially fill the tube are not immediately adjacent the ends but are spaced therefrom.

U.S. Pat. No. 242,459, granted to Leaycraft Jun. 7, 1881, which discloses a pneumatic tube carrier having asymmetric hinged halves being continuously urged to a closed position by a spring means.

U.S. Pat. No. 359,456, granted to McLaughlin, Mar. 15, 1887, discloses a pneumatic tube carrier including a spindle or the like for wrapping a paper document for security during transportation from one location to another.

U.S. Pat. No. 452,471, granted to Barri, May 19, 1891, discloses a pneumatic tube apparatus wherein an opening in the surface of the container is created by twisting one coaxial section with respect to the other.

U.S. Pat. No. 769,233, granted to Pfluger, Sept. 6, 1904, discloses a cash box for use with a pneumatic tube wherein an opening in the carrier is exposed by relative twisting of the two coaxial elements.

U.S. Pat. No. 811,915, granted to Hager Feb. 6, 1906, discloses a pneumatic tube carrier including a specific stop member to prevent damage to the cylinders when the two coaxial halves are twisted relative to each other.

U.S. Pat. No. 1,169,553, granted to MacMillan, Jan. 25, 1916, discloses a means for securely latching a pneumatic tube carrier such that it does not accidentally open in transport.

U.S. Pat. No. 1,827,000, granted to Duffin Oct. 13, 1931, discloses a container for a roll of paper wherein the exterior container includes a hinge which connects two halves which are identical with the exception of an internal flap on one side for securing the container in a closed condition.

U.S. Pat. No. 2,251,238, granted to Busch, Jul. 29, 1941, discloses a pneumatic carrier wherein the coaxial halves are twisted with respect to each other to expose a window opening and includes a spring actuated locking device.

U.S. Pat. No. 3,401,902, granted to Gouyou-Beauchamps et al, Sept. 17, 1968, discloses a large dimension open top carriage for use in pneumatic conveying of large objects.

U.S. Pat. No. 3,593,948, granted to McClellan, Jul. 20, 1971, discloses a pneumatic carrier wherein identical halves are hinged together along one edge and includes spring means for urging the two halves to a closed cylindrical configuration for transport.

U.S. Pat. No. 3,761,039, granted to Hazell, Sept. 25, 1973, discloses a pneumatic carrier system including means for transferring documents from one individual carrier to another, enabling the use of sharp corners (transfer stations) in the transport tube itself.

U.S. Pat. No. 4,470,730, granted Sept. 11, 1984, to Wutherich discloses a pneumatic tube carrier having a separate pocket means to separate coinage from paper money during transport.

In general, pneumatic tube systems known in the art include a closed continuous passageway having a predetermined inner cross-sectional dimension where the passageway includes a plurality of curves or bends having a predetermined radius. A fluid, such as air, is controllably forced through the passageway in a loop to move a carrier through the passageway. In order for the carrier to move freely through the passageway, the dimensions, and in particular the length, of the carriers being used have been limited by the inner cross-sectional dimension and curvature radius of the passageway. Pneumatic delivery systems are used extensively for the rapid and efficient transportation of a wide variety of articles. These delivery systems are used in a number of business operations, including banks, hospitals, office buildings, industrial plants, and truck terminals as a few examples.

Pneumatic carriers for use in such delivery systems come in a wide range of sizes and shapes to accommodate the physical articles to be transported in the system. As an example, pneumatic carriers are provided for transporting cash, messages, stock transaction slips, letters, blueprints, electronic data processing cards, x-rays, pharmaceutical supplies, blood samples, narcotics, viral and bacteria cultures, and a variety of other small physical objects. A watertight carrier can be useful for transporting paper documents, by sealing out water or other material that can harm the paper.

In the past, various mechanisms have been utilized as closure devices for pneumatic tube carriers. For example, many such carriers include an end cap that is hinged with respect to a cylindrical hull on one side of the hull and which has a latch that fastens the end cap to the opposite side of the hull in a closed position. Such carriers employ a variety of fasteners, such as snap fasteners, elastic straps with holes that fit over hooks, or straps that may be secured to bendable posts.

Other types of pneumatic tube carriers are of the side opening variety. One conventional form of such a carrier employs two generally semi-cylindrical sections that are hinged along one longitudinal edge. The hinged sections may be swung toward or away from each other to effectuate opening and closing of the carrier hull. Locking is achieved by virtue of the end caps, which may be twisted to effectuate threaded engagement of the caps onto the carrier hull ends when the hinged hull sections have been closed. That is, the end caps are rotated in such a fashion as to be drawn towards each other onto the ends of the hull, thereby immobilizing the hull sections relative to each other. Rotation of the end caps in the opposite direction releases the hull sections and allows them to be opened.

One preferable configuration utilized by many carrier manufacturers is that of a side opening, wherein the two sides are hinged together, and the two sides are held together when the carrier is closed by use of a hook, or detent or indented type locking lip. Such carriers include latching mechanisms to prevent the door from coming ajar or opening during transit, which could cause the carrier to become lodged in the pneumatic tubes and would also allow the contents of the carrier to spill out into the tube system. In addition, the instructions for latching such side opening containers or carriers are simple to follow, so that the container can be easily placed within the tube system. Such hinging and locking mechanisms make waterproofing or sealing the carrier a particularly difficult task, as hinges and locks are embedded within the mold of the carrier, which is generally formed of plastic.

In another type of side opening pneumatic carrier, the access to the carrier is gained by simultaneously pulling and twisting the ends of the carrier to allow the side opening door to be opened. The instructions for such a two-step process are often difficult for many users to follow, and the physical effort and manual dexterity needed to simultaneously pull and twist both ends of the carrier against a spring resistance is often troublesome for many hospital workers.

A need has thus arisen for an improved type of pneumatic carrier which overcomes these and other disadvantages associated with the prior art devices. In particular, a need has arisen for a pneumatic carrier which can be easily opened, but which also maintains a watertight and airtight seal. Also, the carrier must be able to maintain its air and water tightness, despite the fact that it is subjected to a vacuum transport system, and despite the fact that it will be subjected to extreme environmental conditions, such as repeated use, frequent drops, dust and dirt particles, high speed travel and acceleration, and the like. The carrier could also have a supplemental sensor mechanism to indicate that interior abnormal conditions have developed.

SUMMARY OF THE INVENTION

This invention relates to side and/or top-bottom end opening pneumatic carriers for use in pneumatic tube delivery systems, although by way of example, the side opening pneumatic carrier having two semi-cylindrical shells hinged together will be described in detail. Nevertheless, this invention can be readily used for all types of carriers, in all shapes and sizes.

According to a preferred embodiment of the present invention, the two semi-cylindrical shells are designed for movement between an open and closed position by moving the shells in opposing directions (that is, closing the shells) to prevent the carrier's insertion in the delivery system in a partially closed position and to prevent the opening of the carrier during transit within the delivery system. The present invention provides an elongated carrier for carrying material having any length or width. For example, the length can be a few or even twelve inches or more, which in accordance with its construction, is capable of being used in conventional pneumatic systems having an inner cross-sectional dimension and curvature radius designed for accommodating carriers of conventional designs. In particular, the carrier of the present invention has a length sufficient for carrying medical, biomedical or any other industrial supplies, as required in each installation, at hospitals, universities, etc.

It is, therefore, one object of the present invention to provide an improved carrier capable of carrying elongated materials through conventional pneumatic systems which include a closed passageway having a predetermined inner cross-sectional dimension where the passageway includes curves or bends having a predetermined radius. The conventional systems are designed to accommodate carriers of conventional design with a length limited by the predetermined curvature radius of the passageway.

The carrier, according to the present invention, includes two semi-cylindrical mating, elongated members. The two semi-cylindrical members include means for securing the members to each other to provide a closed elongated compartment, each of the members having an outer cross-sectional dimension which is smaller than the inner cross-sectional dimension of the passageway so that the elongated compartment can pass through the curves of the pneumatic system without engaging the inner surface of the passageway, and each of the members further including means for engaging the inner surface of the passageway to accelerate and stabilize the compartment within the passageway, the surface-engaging means having an outer cross-sectional dimension which is generally equal to the predetermined inner cross-sectional dimension of the passageway. A supplemental ring can be installed around the circumference of the carrier (that is, the two semi-cylindrical in their mated, closed position), to provide an enhanced pressure barrier, to help the carrier move throughout the tube system.

Further, according to the present invention, the ends (which may be tapered) of the first and second members can possess frustoconically shaped and have rounded features to facilitate movement of the carrier through the passageway of the pneumatic system. Both members can include elongated intermediate sections formed integrally with smooth and continuous surfaces. Both members include cooperating hinges, locks and overlapping lips for securing themselves to each other, to form an elongated compartment in the direction of the movement of the carrier. By forming a series of supplemental ridges and walls within the carrier, a watertight and/or airtight grommet can be installed and secured within the carrier, to provide a vapor/liquid barrier, which is a principal aspect of the present invention.

Further, according to the present invention, the exterior surface of the carrier may include one or more accelerator rings formed on the perimeter of both members. The accelerator rings have an outer cross-sectional dimension which allows it to engage the inner surface of the passageway to provide stability to the carrier and allow the carrier top be moved in response to the controlled air pressure within the passageway. Each of the accelerator rings has a small width in relationship to the overall length of the closed elongated compartment, and each is located in proximity to the ends of the first and second members.

The present invention provides a relatively easy to open, side opening pneumatic carrier which can't be inserted into the pneumatic tube delivery system in the partially opened condition. The pneumatic carrier will typically be constructed of plastic, and will contain means to secure articles within the carrier during travel. For example, if the carrier is used to transport biomedical or chemical materials, many of which could be dangerous, the carrier will contain either, preferably, a series of clips to retain test tubes, or alternatively, a formed foam rubber insert, that can be slotted, egg crate shaped, formed with slits or other cavities in any shape or size, including being formed with holes which mate with test tubes, circular openings, and so on, so that breakage can be minimized. In addition, the pneumatic carrier is designed to prevent opening of the carrier once it is in transit in the pneumatic tube delivery system. A lock is incorporated for that purpose.

According to the present invention, a side opening pneumatic carrier has two symmetrical shells of concave cross-sectional area, each shell having first and second longitudinal edges and first and second ends. The carrier includes means for securing said symmetrical shells along a first longitudinal edge of said shells, such that the shells are rotatable between a closed position and open position to provide access to the interior of the carrier.

In one embodiment of the present invention, a side opening pneumatic carrier is provided for use in a pneumatic tube delivery system. The carrier includes two plastic semi-cylindrical shells having first and second longitudinal edges, a plastic, hinged, joint arrangement integrally formed with the shells, which joins the shells together along the first longitudinal edges, such that the shells are rotatable between an open and closed position. In the closed position, the second longitudinal edge of each shell mate together. Because the hinge assembly edges are at an offset with respect to one another, the two shells mate completely along their periphery.

The external closure pieces are dimensioned to be closely received within the pneumatic tube delivery system for preventing the entry of the carrier in a partially opened condition. In the closed position, mating water/air tight grommets are engaged (that is, sandwiched between the two halves of the carrier). In use, then, a watertight barrier, such as a grommet, gasket, sealant, washer, or the like, may be disposed along a watertight element ridge (and along a corresponding watertight element channel), so that a complete seal is formed when the two halves of the carrier are mated together (that is, closed). Accordingly, an interior wall outlines or rings the entire perimeter of the carrier in its closed position, wherein two corresponding gaskets, for example, are disposed along the edges or ends of said interior wall, wherein the mating gaskets seal off the interior cavity of the carrier, from the exterior of the carrier. This methodology is somewhat akin to double or triple walled underground storage tanks, whereby a plurality of barriers are constructed to prevent leakage. Said construction fulfills a long felt need in the field of pneumatic tube carrier design.

Also in accordance with the alternate embodiment of the invention, the carrier includes means for securing the shells in the closed position. A raised area on the external face of each of the internal closure pieces, and an indented area is formed in the internal face of the external closure pieces, such that the raised and reciprocal indented areas are aligned for engaging one another and securing the shells of the carrier in the closed position. A detent or indented lock or clip is used to secure the two halves of the carrier together.

Also in accordance with the alternate embodiment of the invention, a sensor (e.g., an electronic computer controlled sensor) is included within the cavity formed between the two halves of the carrier. That sensor is capable of ascertaining the release of any materials from within the vessels contained within the carrier. For example, the sensor could detect liquids or gasses that should not normally be present within the carrier. IN accordance therewith, the sensor can activate a lock or warning light or signal, that alerts the carrier handler that something has been released within the water/air tight carrier, and that special care must be taken before opening the carrier.

Although the present invention relates primarily to carriers in pneumatic tube systems which are used in hospitals, laboratories, and the like, carriers according to the present invention may also be used to transfer papers, currency and other articles between stations within a building or building complex. Carriers are moved within the tube system by applying air pressure to a tube on one side of a carrier to propel the carrier away from the source of pressure. Such pneumatic tube carrier systems are frequently installed in banks and commercial retail sales establishments. In that case, an important feature would be to keep water out of the carrier, which may contain important, irreplaceable documents. For example, if a retail outlet is transporting bearer bonds or cash, and a roof leak or other flooding condition is present, the carrier should remain dry within.

A further object of the invention is the formation of a carrier for a pneumatic tube system from identically shaped generally semi-cylindrical hull sections. The modular production of hull sections in this manner allows the two sections of the carrier hull to be manufactured of plastic, such as polycarbonate, and produced from a single mold. Naturally the requirement for a single mold to produce both hull sections which can be fitted together in a reverse orientation relative to each other reduces the tooling cost for producing carriers according to the invention by 50%. Such tooling costs are considerable in producing a durable hull by injection molding which is the preferred manner of construction.

Yet a further object of the invention is the construction of a carrier hull from plastic. While a plastic carrier is functionally equivalent to conventional steel, aluminum or cardboard carriers in some respects, plastic has the unique characteristic in that it has a certain "memory" for its original shape. That is, if twisted, struck or otherwise subjected to abuse, the plastic of the carrier of the present invention will tend to return to its original shape. In contrast, metal or cardboard carriers, when subjected to heavy use, are frequently permanently bent or distorted, thus detracting from their geometric symmetry and reducing their useful lives. Conventional carriers which are deformed in this way do not maintain a good air seal in the pneumatic line nearly as well as does the present invention. Also, conventional carriers which have been bent or distorted frequently open in the carrier line during use, thus necessitating the closure of the pneumatic tube system as aforesaid.

There are numerous criteria used in designing a carrier for pneumatic systems. The carrier should preferably be light, inexpensive and foolproof. Also, the carrier should be arranged so that it cannot be entered into a tube system when in an open position or open while in the tube. Such an arrangement ensures that the carrier is closed before it is entered into the system thereby limiting the possibilities that the carrier contents will be lost in the system and that the carrier will become lodged in the system. The carrier should preferably also be capable of carrying a maximum length of materials around given bends in the system and be capable of being locked in a closed position.

According to a particular embodiment of the present invention, a carrier is provided having first and second shells disposed about a longitudinal axis and connected by hinges such that the shells are moved transversely relative to one another when opening and closing the carrier. A pair of ring seals (referred to also as accelerator, glide or travel rings, etc.) are provided intermediate the ends of the carrier for guiding the carrier through a pneumatic tube system and for limiting air seepage past the carrier. End portions of the carrier are tapered to terminate in bumpers and a pair of latches are coupled to the shells for retaining the carrier in a closed position. A lock is provided for combining with the closed shells to prevent unauthorized opening of the carrier.

BRIEF DESCRIPTION OF THE DRAWINGS

The invention will be better understood with reference to the drawings, in which:

FIG. 2A is a perspective view of the interior of a half of a carrier according to the present invention;

FIG. 2B is a side view of a half of a carrier according to the present invention, which shows a latch to lock the carrier in its closed position, and an indicator for signaling conditions interior to a carrier;

FIG. 2C is an end view of a half of a carrier according to the present invention;

FIG. 2D shows a top plan view of the interior of a half of a carrier according to the present invention;

DETAILED DESCRIPTION OF THE PREFERRED EMBODIMENT

The preferred embodiment of the invention is set forth below.

Figure 1:
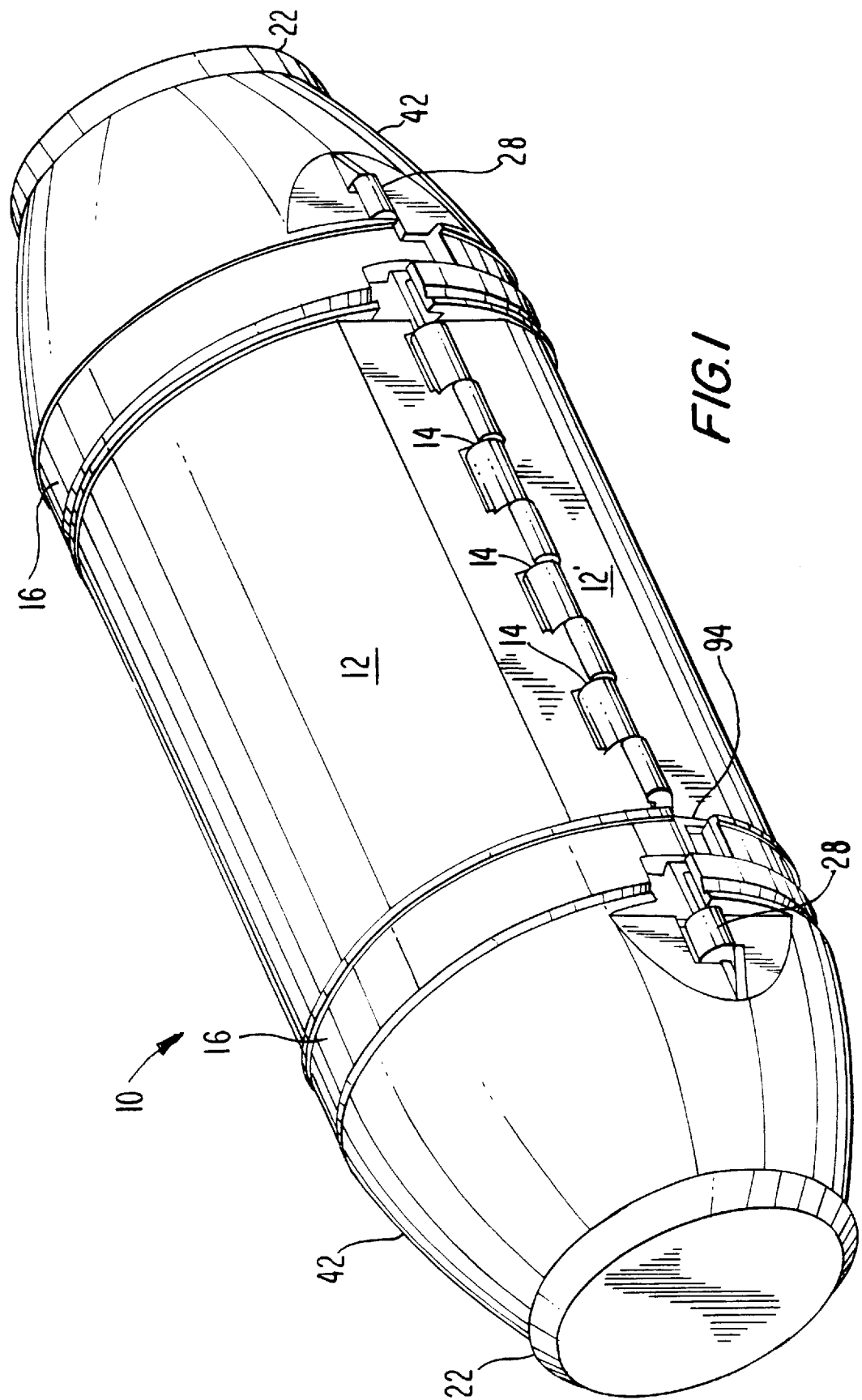
FIG. 1 is an overall view of a carrier according to the invention.

FIG. 1 is an overall view of a carrier according to the present invention. FIG. 1 shows a carrier 10 consisting of first and second shells 12, 12' which extend longitudinally and which are interconnected by hinges 14 and rod locking members 28. Members 28 lock the rod in place, so that hinges 14 can provide for the opening and closing of the carrier 10 halves 12 and 12'. A detailed view of this configuration can be found at FIG. 6. The carrier 10 halves 12 and 12' are formed of plastic, for example, and raised areas are formed along the exterior surface, around the transverse perimeter of the carrier, as shown beneath travel or accelerator rings 16. Two such accelerator or glide or travel rings 16 are used for each carrier 10, and may consist of Velcro® secured plastic or rubber strips. A suitable felt material or Neoprene® material may also be used to make the seals 16, which may also be cut from a sheet of the material such that moisture will tend to cause dimension changes substantially in the direction longitudinal with respect to the carrier, rather than radially. The seals 16 may be adhesively attached to the shells 12, 12' at respective raised portions. The purpose of the rings 16 is so that carrier 10 forms a tight, consistent and secure fit within the interior of the carrier tubes, so that the carrier 10 may travel effectively through the carrier tubes. As the carriers 10 often reach speeds in excess of 25 feet per second, the rings 16 serve to form an air barrier around the carrier 10, so that the carrier 10 does not jam. Also, by minimizing air leakage around the carrier 10, rings 16 can minimize the air required to propel carrier 10. Felt insert 94 is provided, as well, so that the rings 16 appear as continuous concentric circles—and no air can escape the seal which the rings 16 form in relation to the interior of the carrier tubes, even where the hinge assemblies 14 are concerned. Ends of the carrier are defined by respective resilient bumpers 22. Each of the bumpers 22 is preferably larger than half the diameter of the pneumatic tube to avoid possible jamming of one carrier 10 with a second carrier within the pneumatic tube. The shells 12 and 12' are substantially identical in shape and are preferably molded in the same or a similar mold form from a suitable plastic material such as LEXAN (a trademark for a polycarbonate plastic sold by The Canadian General Electric Co.). Because the shells 12 and 12' are substantially identical and can often be made from even the same mold, molding costs can be significantly reduced.

In order to simplify this description, parts of shell 12 will be described, but it should be understood that corresponding parts of shell 12' also may exist, as desired. The shell 12 is generally semi-cylindrical over the major portion of its length, 1 with the exception, for example, of the raised portions under rings 16. Those raised portions may also correspond to internally concave zones, which may contribute to the overall structural integrity of the carrier 10.

The portions of carrier 10 that support the seals 16 are positioned intermediate the ends of the carrier 10 at positions which maximize the available length and diameter dimensions of the carrier. The shells 12 and 12' further includes tapered or frusto-conical end portions 42.

Figure 5C:
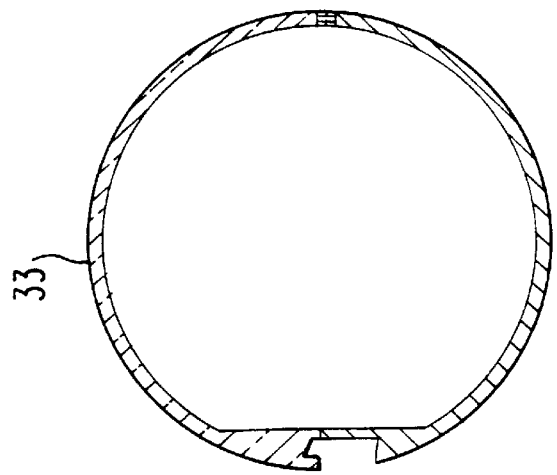
FIG. 5C is a cross-sectional view of a gasket according to the present invention, shown in its closed position.
Figure 5B:
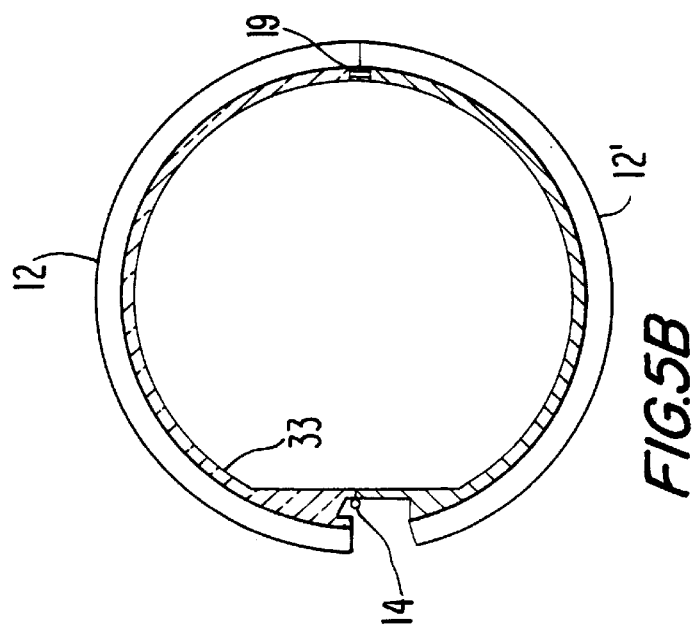
FIG. 5B is a cross-sectional view of a carrier according to the present invention, shown in its closed position.
Figure 5A:
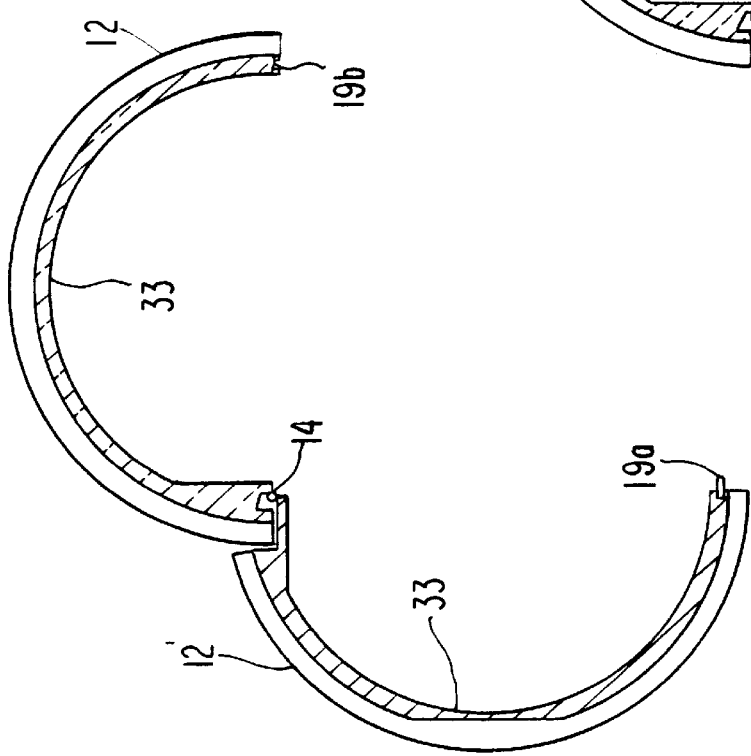
FIG. 5A is a cross-sectional view of a carrier according to the present invention, shown in its open position.

Hinge assemblies 14 are preferably molded as a part of the shells 12 and 12' and (as shown in FIG. 5A) the pivot points of the hinges 14 are offset from mating edges of the shells 12 and 12' to permit the ends of the rings 16 and shells 12 ans 12' to securely mate together when closed, without damage to the seal halves 16. The hinges 14 are preferably located so that they will not contact the interior of the carrier tube walls. Although the carrier tube walls are often made of steel, and the carriers 10 are often made of plastic, it is generally desirable to have only smooth, continuous surfaces contacting the interior of the carrier tube walls. For example, if a metallic hinge 14 were to scratch the interior of the carrier tube wall, ruts could result, which would facilitate air seepage, and a loss of system efficiency, as air passes through said ruts.

FIG. 2A shows the interiors of both halves (12 and 12') of a carrier 10 according to the present invention. FIG. 2B is a side view of a half of a carrier 10 according to the present invention, which shows a latch 26 to lock the carrier 10 into its closed position, and an indicator 90 for signaling conditions interior to a carrier 10. FIG. 2C is an end view of a carrier 10 according to the present invention, which shows the bumper 22.

Shells 12 and 12' form an internal cavity when closed together. That internal cavity is usually entire reason why the carrier 10 exists in the first place. However, certain exceptions may exist. For example, carrier 10 may not be a cavity bearing carrier at all, but rather a sophisticated monitoring vehicle, which contains video or other sensors, to inspect the interior workings of a pneumatic tube system. In that case, carrier 10 would be sent through a tube system, and could transmit or record information indicative of the interior walls of the pneumatic tube system. More usually, the carrier 10 with its internal cavity in place will be used to carry articles between remote points.

Carrier 10 is capable of carrying papers, such as drawings, business documents, cash, x-ray negatives and the like. Carrier 10 is often used to carry vessels, wherein the vessels often contain liquid, solid or gaseous materials that should ideally remain within the vessels. That is, the carrier 10, which moves at high speeds, is often used to carry vessels that contain various liquid substances, which are prone toward leaking out of the carrier 10, if the vessels should break within the carrier 10, or should the vessels become opened in transit (because, for example, a rubber stopper was not securely fastened in the first place, or otherwise failed). Specifically, when the present invention is used within the hospital environment, problems can result when vessels break or open within the carrier 10. The vessels in hospitals often include test tubes with rubber stoppers, intravenous ("IV") bags, blood samples, viral or bacteria cultures, chemicals or other drugs, medicines, acids, or other materials that must be controlled or contained at all times.

Indeed, the vessels may even contain biohazardous materials, such as HIV infected blood, cultures of various viral infections, toxic chemicals such as cyanide, and the like.

Naturally, whenever fragile objects (such as glass test tubes) are to be placed in the carrier 10, these objects are typically mounted in a container or retaining unit, which has been formed to fit snugly with in the cavity defined by the interior surfaces of shells 12 and 12', thereby limiting the possibility of damage to the contents as the carrier 10 passes through the pneumatic tube system. To safeguard against the leakage of such materials, and others, l the carrier 10 according to the present invention has been designed with an internal perimeter wall 34. Perimeter wall 34 provides an additional layer of protection against exposure to the outside world.

Perimeter wall 34 outlines the entire perimeter of carrier 10—more specifically, the boundaries of shells 12 and 121, as set forth in FIG. 2A. Also as shown in FIG. 2A, projections and receptors 72 (on both shells 12 and 121) are adapted to engage each other, (as opposed on the opposing shells 12 and 121), to retain the shells 12 and 121 in a closed position as shown in FIG. 1, with the use of detent latches or locks (not shown). The projections 72 have respective inclined leading faces for deflecting the projections radially inwards as the shells 12 and 12' are brought together. As the shells 12 and 121 move into a closed position, the projections and receptors 72 move radially outward into respective openings, to retain the shells 12 and 121 in the closed position. Projections and receptors 72 are also shown in detail in FIG. 6. One major advantage of this arrangement is that the closing of the shells 12 and 121 is a natural action and requires no teaching. Anyone wishing to close the carrier 10 will naturally bring the shells 12 and 121 together resulting in a snap-action as the detent or interlocking latches move into their mating openings. Respective longitudinal edges of the shells 12 and 12' define interlocking recesses and projections indicated generally by the numerals 72. These edges locate the shells 12 and 121 relative to one another when the shells are in the closed position. Also, because of their shape, the projections/receptors 72 align corresponding edges of the shells on closing the carrier and also prevent closing the carrier unless the' contents are entirely inside the shells. Further advantages of these projections 72 include increased torsional stability because of the interlocking arrangement; and an incidental advantage that because a carrier which is not completely closed will not fit into a pneumatic tube, an operator is forced to ensure that none of the contents project out of the carrier.

In use, it will be evident that unless the shells 12 and 121 are closed, the carrier 10 cannot be entered into a pneumatic tube. This is a significant advantage of the carrier because in the past, if carriers are entered into a tube without first closing the carrier, the result may be to lose the contents of the carrier 10 within the pneumatic tube system or in fouling the system to the extent that it no longer functions satisfactorily. Once the shells 12 and 121 are brought together so that the projections 72 engage in respective openings, the carrier 10 can be locked by inserting a key in, for example, a tumbler, lock 26 (shown in FIG. 2B) and turning a key, or setting a combination. The carrier 10 can then be opened only by further use of the key. However, reference is again made to FIG. 2B to describe the lock switch 26. Alternatively, only authorized persons having a key for an actual lock 26 could be established, to open the carrier, for example, if a controlled substance such as morphine is contained within the carrier 10.

As shown in FIG. 2B, latch switch (or lock) 26 is used to depress the detent locking mechanism, so that the shells 12 and 121 can be separated, and the carrier 10 opened. Locking latches 26 are provided for retaining shells 12 and 121 in the closed position. In addition, electronically activated locks with pins (not shown) may be disposed between shells 12 and 121, so that latch switch 26 may be overridden, or defeated, so that the user of a carrier 10 will not open it if a vessel has become opened or broken in travel. To facilitate this function, indicator 90 is provided on the exterior of the carrier 10. Indicator 90 is connected to internal sensor unit 96 via line 97, as shown in FIG. 2A. Indicator 90, shown in FIG. 2B, will serve to inform the user that a spill or leak has occurred within the cavity of carrier 10. When sensor unit 96 detects the presence of a leak or spill (blood, gas, chemicals, liquids, etc.), indicator 90, which may be a digital display, LED, or even an RS 232 communications port, will inform the user or an external computer, that something has become uncontrolled within the carrier 10. Then, proper precautions may be taken when opening the carrier 10. For example, if toluene has become released within carrier 10, the sensor 96 will identify it as such (via, for example, gas chromatography), and will output its result to indicator 90. Then, indicator 90, which may be an LED, series of LEDs (which may indicate, for example, the severity of the interior condition), or an RS 232 port, can then output the result to a computer (not shown). In automated carrier tube systems, the carrier could even inform the receiving station (the opening to the vacuum tubes) of the condition, so that a user will be presented by, for example, a warning light, so that they will not open the carrier 10 until, in the case of toluene, the carrier 10 is brought to a ventilation hood, so that hazardous fumes may be vented safely away.

Figure 3B:
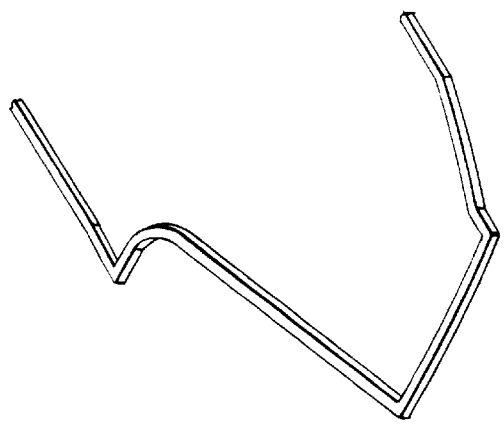
FIG. 3B is a detailed view of a portion of a gasket according to the present invention.
Figure 3A:
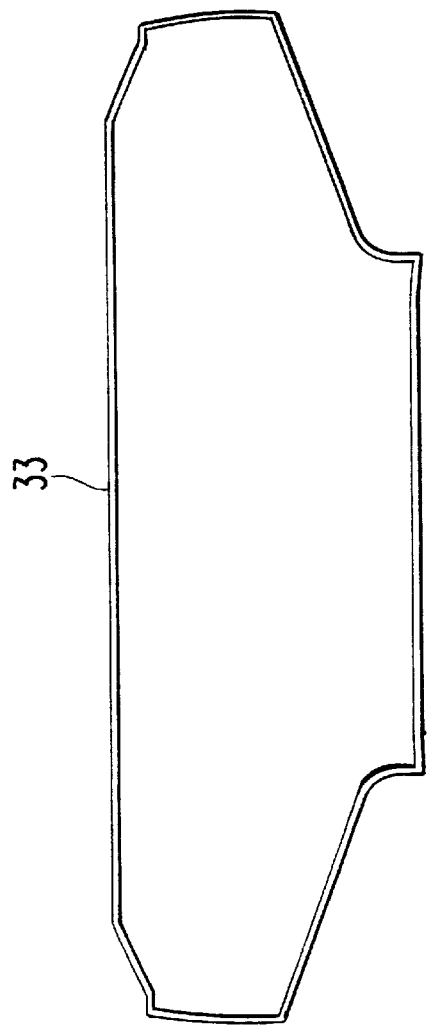
FIG. 3A is a gasket according to the present invention.
Figure 6:
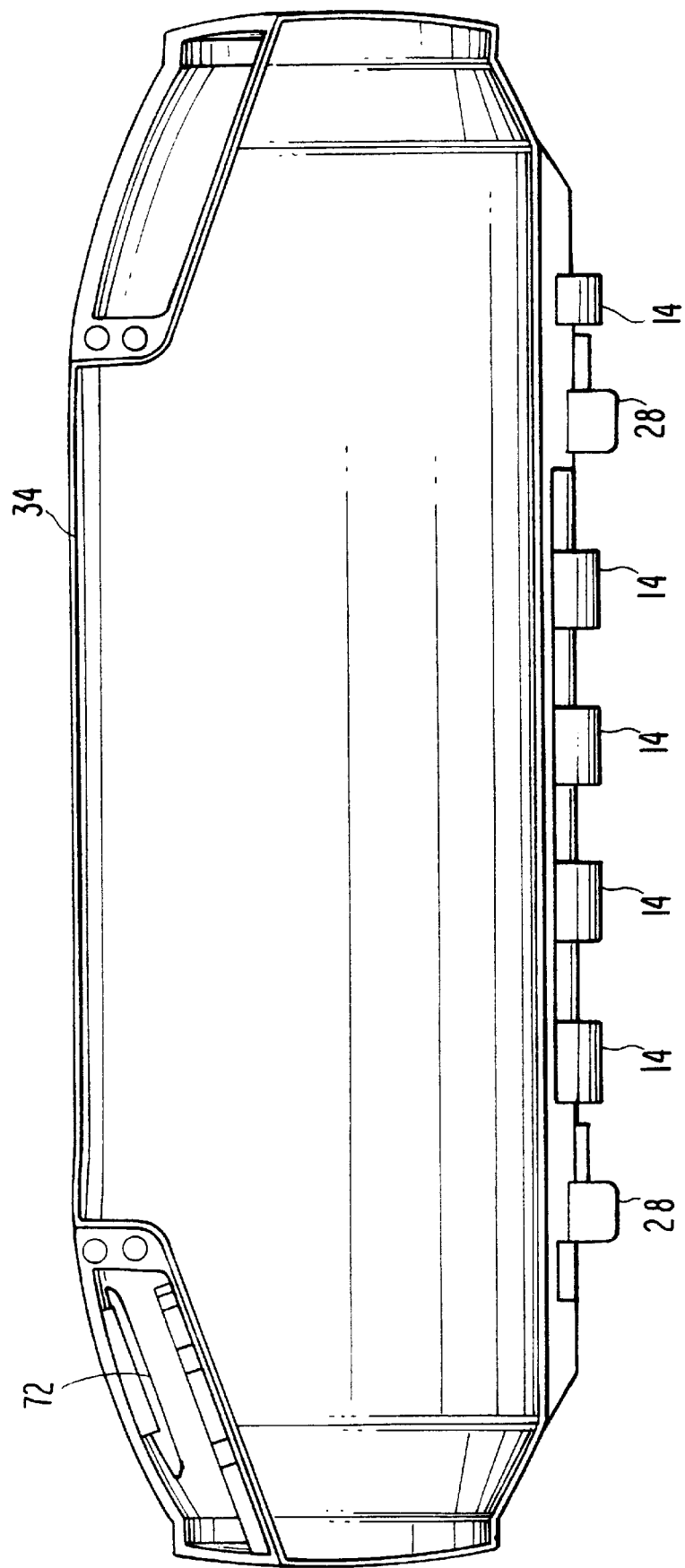
FIG. 6 is a detailed top plan view of a half of a carrier according to the present invention.

In FIGS. 3A and 3B, a gasket, grommet, washer, or other water and air sealing barrier 33 is shown. The gasket 33 is formed to directly track the perimeter wall 34 in size or shape. Importantly, the gasket 33 will be attached to one or both shells 12 and 121, and may sit within or mate within one or two gasket channels, as set forth in FIG. 6. In FIG. 6, the gasket channel 34 (which is merely a part, the top, of perimeter wall 34), is used to seal the carrier 10, so that materials may not escape, and so materials may not enter the internal cavity. Importantly, the shells 12 and 121 may be formed with any number of perimeter walls 34, and in any configuration, so that a plurality of subcompartments may exist. Also, concentric perimeter walls 34 may be formed, as with, for example, triple walled storage tanks in the petroleum industry, for added safety.

Figure 4A:
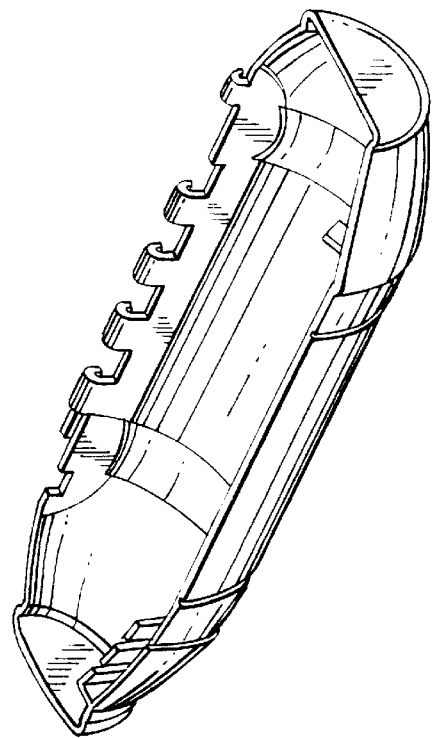
FIG. 4A is a perspective view of the interior of a half of a carrier according to the prior art.
Figure 4B:
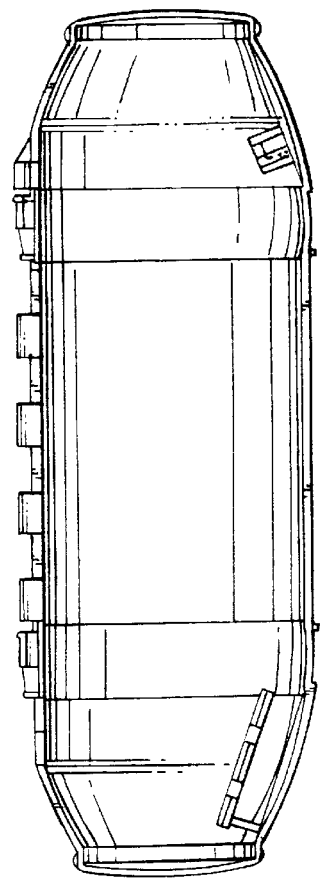
FIG. 4B is a top plan view of the interior of a half of a carrier according to the prior art.

In FIG. 4, a shell according to the prior art is found, wherein no interior perimeter wall is used, and no watertight or airtight properties exist.

In FIG. 5A, the shells 12 and 121 are shown in their open position. Hinge/pivot rod assembly 14 is shown, wherein gasket 33 and shells 12 and 121 are affixed at an offset, with respect to one another. In FIG. 5B, the carrier 10 is shown in its closed position, wherein shells 12 and 121 are seated, and gasket 33 has formed a seal around @he entire cavity of the carrier 10. overlapping lip/groove assembly 19 has been provided, so that the barrier is more secure. That is, lip 19A fit snugly into groove 19B. In FIG. 5C, the gasket 33 is shown in its closed position.

It will be appreciated that although the above description is limited to a generally cylindrical carrier, the invention is applicable to carriers having any suitable cross-section. For instance, carriers having a generally oval cross-section have been used, and the invention is intended for use in carriers of this and other shapes.

While the foregoing embodiments of the invention have been set forth in considerable detail for the purposes of making a complete disclosure of the invention, it will be apparent to those of skill in the art that numerous changes may be made in such details without departing from the spirit and the principles of the invention.

We claim:

1. A carrier for transporting articles through tubes of a pneumatic tube system, the carrier being generally cylindrical and disposed about a longitudinal axis, the carrier comprising;

first and second shells for engagement one with the other in a closed position to enclose an article to be carried, end portions of the shells combining to define tapered end portions of the carrier;

hinge means coupled to the shells for transverse relative movement of the shells to move the shells between the closed position and an open position providing access into the carrier transversely between the shells, mounting support for a closure means operable to secure the shells in the closed position and to release the shells for moving the shells into the open position, and sealing means situated within said shells for forming a gas or liquid barrier within said shells, wherein a sensor is provided to sense gas or liquid within said sealing means.

2. A carrier as claimed in claim 1 in which the closure means comprises a lock coupled to said first shell.

3. A carrier according to claim 1 wherein said gas or liquid barrier is watertight.

4. A carrier according to claim 1 wherein an external indicator is provided to display output from said sensor.

5. A carrier according to claim 1 wherein said sealing means is mounted upon the mating edge of at least one of said shells.

6. A carrier according to claim 5 wherein said mating edge outlines substantially all of the perimeter of said shells.

7. A carrier for transporting articles through tubes of a pneumatic tube system, the carrier being generally cylindrical and disposed about a longitudinal axis, the carrier comprising:

first and second shells for engagement one with the other in a closed position to enclose an article to be carried, end portions of the shells combining to define tapered end portions of the carrier;

two pairs of ring seal halves, one of each pair being attached to a respective one of the shells for engagement with the other of the pair with the shells in the closed position, the ring seal halves being spaced from respective end portions of the carrier and proportioned for guiding the carrier in the tube system and for limiting air seepage past the carrier, hinge means coupled to the shells for transverse relative movement of the shells to move the shells between the closed position and an open position providing access into the carrier transversely between the shells;

the shells having mating edges remote from the hinge means for abutment with the shells in the closed position, mounting support for a closure means operable to secure the shells in the closed position and to release the shells for moving the shells into the open position, and sealing means for forming a gas or liquid barrier within said shells, wherein a sensor is provided to sense gas or liquid within said sealing means.

8. A carrier as claimed in claim 7 in which the closure means comprises a lock coupled to said first shell.

9. A carrier according to claim 7 wherein said gas or liquid barrier is watertight.

10. A carrier according to claim 7 wherein an external indicator is provided to display output from said sensor.

11. A carrier according to claim 7 wherein said sealing means is mounted upon said mating edge of at least one of said shells.

12. A carrier according to claim 11 wherein said mating edge outlines substantially all of the perimeter of said shells.

13. A carrier according to claim 7 wherein said carrier includes means to retain vessels within said carrier.

14. A carrier according to claim 1 wherein said carrier includes means to retain vessels within said carrier.

* * * * *